United States Patent
Hochi et al.

(10) Patent No.: US 6,727,001 B2
(45) Date of Patent: Apr. 27, 2004

(54) LAYERED FILM AND PACKAGING MATERIAL

(75) Inventors: Motonori Hochi, Amagasaki (JP); Shigeru Tanaka, Shiga (JP); Kusato Hirota, Otsu (JP)

(73) Assignee: Toray Industries, Inc., Tokyo (JP)

( * ) Notice: Subject to any disclaimer, the term of this patent is extended or adjusted under 35 U.S.C. 154(b) by 75 days.

(21) Appl. No.: 09/980,714

(22) PCT Filed: Apr. 10, 2001

(86) PCT No.: PCT/JP01/03061

§ 371 (c)(1), (2), (4) Date: Dec. 5, 2001

(87) PCT Pub. No.: WO01/77211

PCT Pub. Date: Oct. 18, 2001

(65) Prior Publication Data

US 2003/0031883 A1 Feb. 13, 2003

(30) Foreign Application Priority Data

Apr. 11, 2000 (JP) ........................................ 2000-109128
Apr. 13, 2000 (JP) ........................................ 2000-111639

(51) Int. Cl.[7] .............................. B32B 27/20; C08J 7/04
(52) U.S. Cl. ..................... 428/520; 428/35.4; 428/35.9; 428/36.6; 428/36.7; 428/325; 428/331; 428/451

(58) Field of Search ................................ 428/35.4, 35.9, 428/36.6, 36.7, 336, 424.2, 424.8, 425.8, 451, 325, 331

(56) References Cited

U.S. PATENT DOCUMENTS 5,766,751 A * 6/1998 Kotani et al. ................ 428/323

FOREIGN PATENT DOCUMENTS

| JP | 9-309266 A | 2/1997 |
| JP | 9-151263 A | 6/1997 |
| JP | 9-324061 A | 12/1997 |
| JP | 11-246729 A | 9/1999 |
| JP | 11-310680 A | 11/1999 |
| JP | 2000-43219 A | 2/2000 |

* cited by examiner

Primary Examiner—D. S. Nakarani
(74) Attorney, Agent, or Firm—Kubovcik & Kubovcik

(57) ABSTRACT

A laminated film is provided which is constituted essentially of a resin substrate and a coated film disposed thereon. The coated film comprises a montmorillonite containing a cation exchanger other than sodium ions and a water-soluble polymer. The laminated film offers a high oxygen-permeability barrier at high humidity and firm bonding between the coated film and the resin substrate at high humidity. A packaging material derived from the laminated film is also provided.

44 Claims, No Drawings

ND PACKAGING
LAYERED FILM AND PACKAGING MATERIAL

BACKGROUND OF THE INVENTION

1. Field of the Invention

The present invention relates to a laminated film that has an excellent oxygen-permeability barrier at high humidity and firm bonding between the coated film and the resin substrate at high humidity. This invention further relates to a packaging material derived from such a laminated film.

2. Description of the Related Art

With regard to packaging materials for use with foods or medicines, the contents in such packaging materials tend to denature on exposure to oxygen gas which permeates the outside into the packaging material. Therefore, the contents cannot be stored over a long period of time. This has given impetus to the development of a film which is so resistant to gas permeation as to preclude gas entering from the outside.

As disclosed in "Polymer Engineering and Science", Vol. 20, No. 22, pp. 1543–1546 (December, 1986), conventional gas barrier films have been formed from polyvinylidene chloride, polyacrylonitrile or polyvinyl alcohol. Recently, however, a serious problem has arisen in that polyvinylidene chloride and polyacrylonitrile are detrimental to the environment when the films formed from these polymers are disposed of. This is because polyvinylidene chloride has chlorine atoms attached to its molecular structure, and polyacrylonitrile has —CN groups attached to its molecular structure. On the other hand, polyvinyl alcohol has a superior gas permeation barrier at low humidity, but largely depends on humidity, resulting in a sharp decline in the gas permeation barrier at high humidity.

In Japanese Unexamined Patent Application Publications No. 10-296929 and No. 11-151786, barrier films against gas permeation have been proposed in which a lamella composed of inorganic particles is laminated on a water-soluble polymer film. Such a barrier film is sufficiently impermeable to gas since it is less dependent on humidity. However, it poses a problem in that the bonding between the coated film and the resin substrate becomes markedly poor at high humidity.

SUMMARY OF THE INVENTION

Accordingly, it is one object of the present invention to provide a laminated film which has an excellent oxygen-permeability barrier even at high humidity and firm bonding between the coated film and the resin substrate even at high humidity. Another object of this invention is to provide a packaging material using such a laminated film.

The above objects of the present invention can be achieved by the provision of a laminated film comprising a resin substrate and a coated film laminated thereon, wherein the coated film comprises a montmorillonite containing a cation exchanger other than sodium ions and a water-soluble polymer.

More specifically, according to a first aspect of the present invention, a laminated film comprising a resin substrate and a coated film laminated thereon is provided, wherein the coated film comprises a montmorillonite and a water-soluble polymer, and the content of a potassium element in the coated film is in the range of 0.1% by weight to 5% by weight.

According to a second aspect of this invention, a laminated film comprising a resin substrate and a coated film laminated thereon is provided, wherein the coated film comprises a montmorillonite and a water-soluble polymer, and the content of a sodium element in the coated film is 0.6% by weight or less.

According to a third aspect of this invention, a laminated film comprising a resin substrate and a coated film laminated thereon is provided, wherein the coated film comprises a montmorillonite and a water-soluble polymer, and said water-soluble polymer comprises at least two water-soluble resins having different polymerization degrees.

According to a fourth aspect of this invention, a packaging material is provided comprising a laminated film described in one of the first to third aspects.

According to a fifth aspect of this invention, a packaging material is provided comprising a laminated film described in one of the first to third aspects and a supporting material disposed on the laminated film.

DETAILED DESCRIPTION OF THE PREFERRED EMBODIMENTS

In general, montmorillonite has a configuration in which a tetrahedral structure-constituting layer and an octahedral structure-constituting layer are bonded to each other in a 2 to 1 ratio and in a plate-like formation. In the tetrahedral layer, $Si^{4+}$ is coordinated relative to $O^{2-}$, and in the octahedral layer, $Al^{3+}$, $Mg^{2+}$, $Fe^{2+}$, $Fe^{3+}$, $Li^+$ and the like are coordinated relative to $O^{2-}$ and $OH^-$. Montmorillonite is mineral clay which has a tendency to incorporate and absorb water between its crystalline plate-like layer units, is very thin and is formed as a single particulate plate from one such crystalline layer unit or those layer units overlaid on each other.

Moreover, montmorillonite has a water molecule-accompanying cation exchanger existing between the crystalline layers (this cation exchanger also being called an interlaminar cation exchanger). The cation exchanger usually includes $Mg^{2+}$, $Ca^{2+}$, $Na^+$, $K^+$ and $H^+$. Naturally occurring montmorillonite is broadly grouped into sodium ion-type montmorillonite (Na-montmorillonite), which is abundant in sodium ions as the cation exchanger, and calcium ion-type montmorillonite (Ca-montmorillonite), which is abundant in calcium ions as the cation exchanger.

Montmorillonite suitable for the present invention contains a cation exchanger other than sodium ions. The cation exchanger other than sodium ions, which can be used in this invention, is chosen from alkaline metal ions excluding sodium ions, alkaline earth metal ions, benzoruthenium ions, alkyldimethylammonium ions, quaternary alkylammonium ions such as aminosilanes made quaternary, and surface active agents capable of developing complex ions. The sodium ions contained in the montmorillonite can be replaced by such a cation exchanger. This replacement prevents the montmorillonite from swelling, so that the resulting laminated film yields a high oxygen-permeation barrier at high humidity and firm bonding between the coated film and the resin substrate at high humidity. Replacing the sodium ions with potassium ions is particularly preferred because the above effects can be further enhanced.

In the laminated film of the present invention, the potassium element content in the coated film is set within the range of 0.1% by weight to 5% by weight in order to improve the oxygen-permeation barrier and film-to-substrate bonding at high humidity. A content of 0.3% by weight to 1.2% by weight is more preferable.

The term "potassium element content in the coated film" used here refers to the potassium element content based on the total weight of all the components in the coated film containing montmorillonite and a water-soluble polymer.

In addition, in the laminated film of the present invention, the sodium element content in the coated film is set at 0.6% by weight or less in order to improve the oxygen-permeation barrier and the film-to-substrate bonding at high humidity. A content of 0.4% by weight or less is more preferable, and a content of 0.2% by weight or less is still more preferable.

For analytical examination of the above contents of elements, conventional atomic spectrometry and ICP may be used.

In the montmorillonite according to the present invention, the leaching of a cation exchanger other than sodium ions is preferably 40 or more (milliequivalent per 100 g of montmorillonite), and the leaching of potassium ions is preferably 10 or more (milliequivalent/100 g). A leaching of potassium of 40 or more (milliequivalent/100 g) is particularly preferable. When the leaching of a cation exchanger other than sodium ions is within the above specified range, a good oxygen-permeation barrier and film-to-substrate bonding can be obtained.

The term "leaching of a cation exchanger" used here represents the amount of a cation exchanger contained between the crystalline layers in the montmorillonite.

With further regard to the leaching of sodium ions in the montmorillonite, 40 or less (milliequivalent/100 g) is preferable, and 30 or less (milliequivalent/100 g) is more preferable.

If the average particle diameter of the montmorillonite is 0.2 µm or less, preferably 0.1 µm or less, and more preferably 0.05 µm or less, the film-to-substrate bonding can be improved. If the average particle diameter is 0.5 µm or more, preferably 1 µm or more, and more preferably 5 µm or more, the gas-permeation barrier can be improved. In the case where two or more montmorillonites with different average particle diameters are combined, the respective properties of both clays can be attained in a balanced state.

Also preferably, two or more montmorillonites with different cation exchangers may be used in combination. For example, when a Na-montmorillonite and a K-montmorillonite are combined, the content of the K-montmorillonite in the whole montmorillonite is preferably 10% by weight to 100% by weight, more preferably 90% by weight to 100% by weight.

The average particle diameters of the montmorillonites may be measured from photographs taken at a magnification of 10,000 times to 100,000 times using any suitable conventional analytical process such as diffraction/scattering, dynamic light scattering or transmission electron microscopy.

Specific examples of the water-soluble polymer are polyvinyl alcohol or copolymers thereof, cellulose derivatives such as carboxymethylcellulose and hydroxyethylcellulose, starches such as oxide starch, esterified starch and dextrin, polyvinyl pyrrolidone, polyester copolymers containing a polar group such as sulfoisophthalic acid or the like, vinyl polymers such as polyhydroxyethyl methacrylate or copolymers thereof, acrylic resin, urethane resin and ether resin. Other varieties of polymers can also be used which are obtained by modifying the above-listed polymers with a functional group such as carboxyl, amino or methylol. Ideally, polyvinyl alcohol or its copolymers are preferable. Polyvinyl alcohol is a product derived from saponification of polyvinyl acetate. A polyvinyl alcohol with a saponification value of 80% by mol or more is particularly preferable. The polyvinyl alcohol copolymer preferred here is structured such as to have a vinyl alcohol unit in an amount of 60% by mol or more. Especially, a saponified product of an ethylene-vinyl acetate copolymer is suitably chosen which contributes markedly to enhancing the oxygen-permeation barrier under highly humid conditions.

In the water-soluble polymer according to the present invention, the average polymerization degree is preferably 100 to 5,000, more preferably 200 to 2,500, and most preferably 400 to 1,800. The term "average polymerization degree" represents the number-average polymerization degree. If the average polymerization degree is observed within this specific range, the resulting coated film has increased strength and is easy to form with uniformity.

In the present invention, it is desired that two or more water-soluble resins with different average polymerization degrees be used as the water-soluble polymer to yield a coated film having good transparency in addition to an excellent oxygen-permeation barrier and film-to-substrate bonding. A water-soluble resin with a lower average polymerization degree of 200 to 800 and a water-soluble resin with a higher average polymerization degree of 1,000 to 2,000 are mixed to enhance the oxygen-permeation barrier and film-to-substrate bonding even at high humidity. More preferably, the lower average polymerization degree is set at 300 to 700 and the higher average polymerization degree at 1,300 to 1,700.

In the coated film according to the present invention, the content of the montmorillonite is preferably 1% to 60% by weight ratio, and more preferably 10% to 50%. This specific montmorillonite content permits both the oxygen-permeation barrier and film-to-substrate bonding to be improved at the same time.

In the coated film according to the present invention, the thickness is preferably 0.01 µm to 10 µm from the viewpoint of the oxygen-permeation barrier. When a layer composed of a metal and/or a metal oxide is disposed, the coated film thickness is preferably 0.05 µm to 3 µm.

To the coated film, various additives may be added in amounts of 30% or less by weight ratio if they do not adversely affect the oxygen-permeation barrier and transparency. Examples of the additives are chosen from an antioxidant, a weathering agent, a heat stabilizer, a lubricating agent, a crystal nucleator, an ultraviolet absorber, a coloring agent and the like. Inorganic or organic particles may also be added at amounts of 20% or less by weight ratio if they do not impair the transparency and oxygen-permeation barrier. These particles are chosen, for example, from calcium carbonate, titanium oxide, silicon oxide, calcium fluoride, lithium fluoride, alumina, barium sulfate, zirconia, calcium phosphate and crosslinked polystyrene particles.

The resin substrate suitable for the present invention is a film derived from a specific selected polymer. The material for the above resin substrate includes polyolefins such as polyethylene and polypropylene, polyesters such as polyethylene terephthalate, polybutylene terephthalate and polyethylene-2,6-naphthalate, polyamides such as nylon 6 and nylon 12, polyvinyl chloride, ethylene-vinyl acetate copolymer or a saponified product thereof, polystyrene, polycarbonate, polysulfone, polyphenylene oxide, polyphenylene sulfide, aromatic polyamide, polyimide, polyamide imide, cellulose, cellulose acetate, polyvinylidene chloride, polyacrylonitrile and polyvinyl alcohol, and copolymers thereof. A polyester such as polyethylene terephthalate and polyolefins such as polyethylene and polypropylene are preferred from the viewpoints of the transparency and oxygen-permeation barrier. Polyolefins such as polyethylene and polypropylene are particularly preferable since they are highly resistant to moisture vapor transmission.

More preferably, the resin substrate can be surface-treated, prior to formation of the coated film thereon, by means of corona discharge treatment, flaming treatment or plasma treatment.

The resin substrate may be of a nonstretched film, a monoaxially stretched film or a biaxially stretched film, and with dimensional stability and mechanical properties in mind, a biaxially stretched film is the most preferable. To the resin substrate, various additives may be added which are chosen, for example, from an antioxidant, a weathering agent, a heat stabilizer, a lubricating agent, a crystal nucleator, an ultraviolet absorber, a coloring agent and the like. Inorganic or organic particles may also be added if they do not impair the transparency. Examples of the particles are talc, kaolinite, calcium carbonate, titanium oxide, silicon oxide, calcium fluoride, lithium fluoride, alumina, barium sulfate, zirconia, mica, calcium phosphate and crosslinked polystyrene particles. The average particle diameter of the above particles is preferably 0.001 $\mu$m to 10 $\mu$m, and more preferably 0.003 $\mu$m to 5 $\mu$m. The term "average particle diameter" used here refers to the particle diameter measured as the average number of particles from photographs taken at a magnification of 10,000 times to 100,000 times by transmission electron microscopy.

The above resin substrate is preferably transparent in nature and has a light transmission of preferably 40% or more, and more preferably 60% or more. Further, the resin substrate surface is preferably smooth and has a thickness of preferably 2 $\mu$m to 1,000 $\mu$m although this range is not restrictive.

In the laminated film of the present invention, haze is preferably 20% or less, more preferably 15% or less. If a laminated film with a haze of more than 20% is used as a packaging material, the color and shape of the contents are difficult to observe from an external view.

From the viewpoints of the oxygen-permeation barrier and film-to-substrate bonding, and extension barrier and printability in particular, it is desired that a layer formed from one of a metal or an oxide thereof and a non-metal or an oxide thereof be further disposed on either one or both of the surfaces of the resin substrate, followed by formation of the above-specified coated film on the resulting metallic layer. As for the metal or the oxide thereof and the non-metal or the oxide thereof, metals such as aluminum, zinc and magnesium and oxides thereof, and a non-metal such as silicon and an oxide thereof are preferred. Where transparency is required, oxides are preferably used, among which a metal oxide of aluminum and a non-metal oxide of silicon are particularly preferred from the viewpoints of the oxygen-permeation barrier, extension barrier and productivity.

Alternatively, the layer formed from a metal or an oxide thereof, or a non-metal or an oxide thereof may be disposed on the coated film formed in direct contact with the resin substrate. Also in such an instance, the resulting laminated film has an improved oxygen-permeation.

In addition and more preferably, an anchor layer may be disposed on the resin substrate using an anchoring agent such as urethane resin, epoxy resin or polyethylene imine, followed by formation of the coated film on the anchor layer. Such a construction can improve the film-to-substrate bonding. Although not restricted, the thickness of the anchor layer is preferably set from 0.1 $\mu$m to 0.3 $\mu$m.

In the laminated film of the present invention, the peeling strength between the coated film and the resin substrate is preferably 0.5 N/cm or more at a temperature of 40° C. and at a humidity of 90%. This laminated film provides a packaging material for use with foods or medicines, which provides superior hermetic sealing and a shelf stability of the utmost reliability.

To produce a packaging material, the laminated film of the present invention can be used as it is, or after being disposed on another supporting material. Here, no limitation is placed on the supporting material if it is known in the art, but examples are paper, a metal such as aluminum or an oxide thereof, a non-metal such as silicon or an oxide thereof, nonwoven fabric and polymeric film. Of the listed materials, the polymeric film includes a non-stretched film, biaxially stretched film, co-extruded film, coated film, deposited film and melt-extruded resin. The base material for the above polymeric film includes polyolefins such as polyethylene and polypropylene, polyesters such as polyethylene terephthalate, polybutylene terephthalate and polyethylene-2,6-naphthalate, polyamides such as nylon 6 and nylon 12, polyvinyl chloride, ethylene-vinyl acetate copolymer or a saponified product thereof, polystyrene, polycarbonate, polysulfone, polyphenylene oxide, polyphenylene sulfide, aromatic polyamide, polyimide, polyamide imide, cellulose, cellulose acetate and polyacrylonitrile, and copolymers thereof. No limits are imposed on the manner in which the laminated film of this invention is disposed on the supporting material, and therefore, a print layer, an adhesive layer or an anchor layer may be interposed between the laminated film and the supporting material.

An explanation will now be provided with regard to a specific typical method by which the laminated film according to the present invention can be produced. However, such a method should not be construed as limiting this invention.

To form the coated film on the resin substrate, the components of the coated film are dispersed in a selected solvent to prepare a dispersion which is preferably coated using gravure coating, reverse coating, spray coating, kiss coating, comma coating, die coating, knife coating, air-knife coating or metering-bar coating. Each such coating means can form a thin film at high speed. More preferably, the resin substrate is pretreated so as to be bondable by nature, prior to formation of the coated film thereon, by the use of corona discharge treatment effected for example in air, in nitrogen gas, in a mixture of nitrogen-carbon dioxide gases, or in any other environment, or plasma treatment effected under reduced pressure, flaming treatment or ultraviolet treatment. Also preferably, anchoring treatment is performed using an anchoring agent such as urethane resin, epoxy resin or polyethylene imine.

When the resin substrate is formed from a biaxially stretched film of either a polyester such as polyethylene terephthalate or a polyolefin such as polypropylene, both off-line coating and in-line coating may be used. Off-line coating denotes that coating is carried out after the film-forming steps are completed, whereas in-line coating denotes that coating is carried out during film formation. If the in-line coating process is used, coating is effected preferably before heat setting of the film. The term "heat setting" used here means that a stretched film is permitted to crystallize upon heat treatment while the film is maintained at a temperature higher than the stretching temperature, but lower than the melting point. Thus, coating is preferably effected with respect to a nonstretched film, a film just stretched monoaxially in its machine or transverse direction, or a film just stretched biaxially. A film just stretched monoaxially is particularly preferred and then undergoes further stretching along one or more axes and subsequent heat setting.

The coated film may be dried by hot rolling, contacting with a heated medium (air or oil), infrared heating or microwave heating. With the oxygen-permeation barrier in mind, the drying temperature is preferably 60° C. to 180° C. in the case of off-line coating and preferably 80° C. to 250° C. in the case of in-line coating. The drying time is preferably 1 second to 60 seconds, and more preferably 3 seconds to 30 seconds.

In a coating liquid prepared to contain the components of the coated film, it is desired that the montmorillonite particles be homogeneously dispersed or swollen in a selected solvent and that the water-soluble polymer be homogeneously dissolved in the solvent. Examples of the solvent used here are chosen from water and a mixture of water and a lower alcohol. A water-lower alcohol mixture is preferable.

The solid content of the coating liquid is preferably 2.5% or more from the productivity viewpoints such as the viscosity and drying efficiency of the coating liquid. In the instance where a coating liquid with a solid content of less than 2.5% is used, a low-boiling solvent, which solvent has an affinity for water and is highly volatile, may be added to the coating liquid. Alternatively, the resulting coated film may be dried at a temperature higher than 100° C.

To increase coatability of the coating liquid, another water-soluble organic compound may be added as a third component to the water-lower alcohol mixture if the dispersion is maintained stable. Examples of the water-soluble organic compound include alcohols such as methanol, ethanol, n-propanol, isopropanol and the like, glycols such as ethylene glycol, propylene glycol and the like, glycol derivatives such as methyl cellosolve, ethyl cellosolve, n-butyl cellosolve and the like, polyhydric alcohols such as glycerin, wax and the like, ethers such as dioxane and the like, esters such as ethyl acetate and the like, and ketones such as methyl ethyl ketone and the like. The pH of the dispersion is preferably 2 to 11 from the stability viewpoint.

The process for preparing the above coating liquid is not restricted, but a process is preferred in which the montmorillonite is homogeneously dispersed in a selected solvent, followed by mixing of the dispersion with a solution obtained by homogeneously dissolving the water-soluble polymer in the solvent. It is desired that both the water-soluble polymer and the montmorillonite be markedly homogeneously dispersed in the coating liquid. Because the montmorillonite in particular may have been secondarily agglomerated in the resulting dispersion, forced dispersion is further required after the montmorillonite is dispersed in a selected solvent. To this end, a homomixer, a jet agitator, a ball mill, a kneader, a sand mill or a three-roll mill is used in which shearing force and sliding stress are applied. For example, the montmorillonite is homogeneously dispersed in water at a solid content of several weight percentages and then treated by means of mechanical dispersion using a homomixer or the like, followed by mixing of the dispersion with an aqueous solution of the water-soluble polymer obtained by homogeneously dispersing the same in water at a solid content of several weight percentages. In succession, the resulting mixture is once again subjected to dispersion treatment, and the solid content of this dispersion is adjusted by the addition of a lower alcohol and water. Moreover, the coating liquid may be mixed, where desired, with a crosslinking agent, particles and the like.

The present invention will be further described with reference to the following examples.

Evaluation Methods of Various Characteristics

First of all, the evaluation methods of various characteristics used in this invention are explained below.

(1) Oxygen-permeability Barrier

Oxygen-permeability barrier was measured according to ASTM D-3985 with an oxygen-permeability measuring instrument (OX-TRAN 2/20 manufactured by Mocon Co.). Measuring conditions were at a temperature of 23° C. and at a relative humidity (RH) of 80%.

(2) Bonding Between Coated Film and Resin Substrate (Moisture-Resistant Peeling Strength)

Firstly, a coated film-laden surface of the film (OPP) according to the present invention was allowed to dry-laminate with one surface of a nonstretched polypropylene film (CPP; T3501 manufactured by Toray Synthetic Film Co., Ltd.; 50 $\mu$m) using a polyurethane adhesive ("DICDRY", LX-401A, SP-60 manufactured by Dainippon Ink and Chemicals, Incorporated; mixing ratio: LX-401A:SP-60=1:1; diluting solvent: ethyl acetate; drying temperature: 70° C.; drying time: 30 seconds; coating weight: 2.0 g/m$^2$ based on dry weight of essential components in the coating liquid). Aging was effected at 40° C. for 48 hours. Subsequently, the resulting laminated film was cut to obtain a test film of 15 mm in a transverse direction (TD) and 10 cm in a machine direction (MD) in size. The test film was humid-aged in a thermo-hygrostat controlled at 40° C. and at 90% RH. Immediately after completion of the humid aging, the peeling resistance of both CPP and OPP was measured with a tensile machine (Autograph 1M-100 Model manufactured by Shimadzu Corporation.).

(3) Haze

Turbidity was measured while the coated film-laden surface of the test film was irradiated with light rays with a direct-reading haze computer (HGM-2DP manufactured by Suga Test Instruments Co., Ltd.).

(4) Cation Exchange Capacity of Montmorillonite

Measurement was performed according to the method described in the "Clay Handbook", 2nd Ed., pp. 681–684 (The Clay Science Society of Japan), "Chapter II: Analyses and Tests, 6. Analysis Methods of Soil Clay, 6.9 Measurements of Ion Exchange Capacities".

(5) Cation Exchanger Leaching in Montmorillonite

A montmorillonite at an amount of 0.4 to 0.5 g was used as a sample. Using a cation exchange measuring instrument (manufactured by Fujiwara Scientific Company Ltd.), the cation contained in the sample was leached in 100 ml of a 1N-ammonium acetate solution over 4 to 24 hours. The quantity of the cation leached in this solution was measured by ion chromatography (as described in the "Nendo Handbook" (Clay Handbook in Japanese), 2nd Ed., pp. 371–372 (The Clay Science Society of Japan), "Chapter II: Analyses and Tests 1. Analysis Methods of Soil Clay, g. Ion Chromatography") or by atomic spectrometry. The equivalent weights of sodium ions, potassium ions and other cations per 100 g of the dry montmorillonite were calculated. Alternatively, this leaching may be determined by the method of Inoue et al. (A. Inoue and H. Minato, "Clay Science", 5, 125–126 (1978)).

(6) Contents of Potassium and Sodium Elements in the Coated Film

A suitable size for measurement was cut from the laminated film to obtain a test film. After weighing, the test film was immersed in hot water heated at 100° C., followed by release of the coated film from the resin substrate. The contents of the potassium and sodium elements in the coated film were measured by atomic spectrometry. The coated film-free resin substrate was dried to measure the weight, which was then subtracted from the initial weight of the coated film-laden resin substrate, in which releasing had not yet been effected. The weight difference thus counted was determined to be the weight of the coated film in the test film. In this way, the contents of the potassium and sodium elements in the coated film were calculated.

EXAMPLES

Example 1

A montmorillonite ("Kunipia" F manufactured by Kunimine Kogyo K. K.; cation exchange capacity: 100 (milliequivalents/100 g) with an average particle diameter of 1.0 µm was dispersed in water to prepare an A1 solution with a solid content of 3% by weight. The cation leaching of the montmorillonite in the A1 solution was measured to have potassium ions of 2.3 (milliequivalents/100 g) and sodium ions of 100 (milliequivalents/100 g).

Potassium chloride was added to the A1 solution such that the amount of potassium was the same as the cation exchange capacity of the montmorillonite, thereby replacing part of the interlaminar sodium ions in the montmorillonite with the potassium tons. Thereafter, filtration was effected with a filter paper to remove the sodium ions liberated in the A1 solution after replacement by the potassium ions. The residue was washed with 1 liter of purified water based on a solid content of 5 g of the montmorillonite. Thus, a potassium ion-type montmorillonite (a K-montmorillonite) M1 was prepared.

The K-montmorillonite M1 was dispersed in water to have a solid content of 4% by weight so that an A2 solution was prepared. The cation leaching of the montmorillonite in the A2 solution was measured to have potassium ions of 43.3 (milliequivalents/100 g) and sodium ions of 45.6 (milliequivalents/100 g).

Subsequently, the A2 solution was further subjected to mechanical dispersion with a homomixer (revolution: 3,500 rpm) so as to ensure the absence of agglomerates. Thus, an A3 solution was prepared.

A B1 solution having a solid content of 6.7% was prepared using a polyvinyl alcohol as a water-soluble polymer (hereinafter called PVOH) having a saponification value of 98.0% by mol and a polymerization degree of 500 and water as a solvent. The B1 solution was again dispersed with a homomixer to prepare a B2 solution.

The A3 solution was mixed with the B2 solution in a weight ratio of A3 solution: B2 solution=42:58, and the mixture was dispersed with a homomixer, followed by addition of 20% by weight of isopropyl alcohol (hereinafter called IPA) based on the weight of the whole solvent. Thus, a coating liquid with a solid content of 4.5% by weight was prepared.

A corona discharge-treated, biaxially stretched polypropylene film ("TORAYFAN" manufactured by Toray Industries, Inc.; thickness: 20 µm) was used as a resin substrate. Using a gravure coater (coating speed: 150 m/min), this film was coated at a dry coating thickness of 0.2 µm with a solution prepared by diluting a urethane adhesive in ethyl acetate (manufactured by Takeda Chemical Industries, Ltd.; main component: "TAKELAC" A3210; curing agent: "TAKENATE" A3070). Drying was effected under low tension at 70° C. for 5 seconds in a hot-air dryer to form a coated anchor layer on the resin substrate. In succession, the surface of the anchor layer on the resin substrate was coated at a dry coating thickness of 0.5 µm with the montmorillonite-containing coating liquid obtained above. Drying was effected under low tension at 120° C. for 10 seconds in a hot-air dryer so that a laminated film was formed. The characteristics of the resulting laminated film are shown in Table 2, and this film was found to have an excellent oxygen-permeation barrier, film-to-substrate bonding and transparency.

In the above laminated film, the content of the potassium element in the coated film was analyzed to be 0.5% by weight.

Example 2

A laminated film was formed in the same manner used in Example 1, except that on the polypropylene film of Example 1, aluminum was deposited at a thickness of 40 nm under high vacuum with an electronic beam-heating depositing apparatus. The characteristics of the laminated film are shown in Table 2, and this film was found to have an excellent oxygen-permeation barrier and film-to-substrate bonding.

Example 3

A laminated film was formed in the same manner used in Example 1, except that in the A2 solution of Example 1, the K-montmorillonite was mixed with an ion exchange-free, Na-montmorillonite in a weight ratio of K-montmorillonite:Na-montmorillonite=50:50. The characteristics of the laminated film are shown in Table 2, and this film was found to have an excellent oxygen-permeation barrier and film-to-substrate bonding.

Example 4

A laminated film was formed in the same manner used in Example 1, except that in the A1 solution of Example 1, potassium chloride was added such that the amount of potassium was twice as much as the cation exchange capacity of the montmorillonite, thereby replacing part of the interlaminar sodium ions in the montmorillonite with the potassium ions. The potassium ion leaching of the montmorillonite in the A2 solution thus obtained was measured to show 81.1 (milliequivalents/100 g). The characteristics of the laminated film are shown in Table 2, and this film was found to have an excellent oxygen-permeation barrier and film-to-substrate bonding.

Comparative Example 1

A laminated film was formed in the same manner used in Example 1, except that the interlaminar ions in the montmorillonite were not replaced by the potassium ions. The characteristics of the laminated film are shown in Table 2, and this film had an unacceptable oxygen-permeation barrier and film-to-substrate bonding.

In the above laminated film, the content of the potassium element in the coated film was analyzed to be 0.03% by weight.

Comparative Example 2

A laminated film was formed in the same manner used in Example 2, except that the interlaminar ions in the montmorillonite were not replaced by the potassium ions. The characteristics of the laminated film are shown in Table 2, and this film had an unacceptable film-to-substrate bonding.

Example 5

An A2 solution was prepared in the same manner used in Example 4. The cation leaching of the montmorillonite in the A2 solution was measured to have potassium ions of 81.1 (milliequivalents/100 g) and sodium ions of 25.5 (milliequivalents/100 g). Further, the A2 solution was mechanically dispersed with a homomixer (revolution: 3,500 rpm) to ensure the absence of agglomerates. Thus, an A3 solution was prepared.

A B1 liquid having a solid content of 5% was prepared by dispersing a polyvinyl alcohol (hereinafter called PVOH) having a saponification value of 98.0% by mol and a polymerization degree of 500, as a water-soluble polymer, in purified water and then by dissolving the polymer by stirring at 90° C. for 1 hour. A C1 solution having a solid content of 5% by weight was likewise prepared by dispersing PVOH having a saponification value of 98.0% by mol and a polymerization degree of 1,700 in purified water and then by dissolving the polymer by stirring at 90° C. for 1 hour. The B1 and C1 solutions were again dispersed with a homomixer to prepare a B2 solution and a C2 solution, respectively.

The B2 solution was mixed with the A3 solution, and the mixture was dispersed with a homomixer. Then, the C2 solution was further added, and the whole mixture was dispersed with a homomixer. In this case, the mixing ratio was set to be A3:B2:C2=1:1:1. To the dispersion-treated mixture, isopropyl alcohol (hereinafter called IPA) was added at an amount of 20% by weight based on the weight of the whole solvent. Thus, a coating solution with a solid content of 3% by weight was prepared.

A corona discharge-treated, biaxially stretched polypropylene film ("TORAYFAN" T-2535 manufactured by Toray Industries, Inc.; thickness: 20 µm) was used as a resin substrate. Using a gravure coater (coating speed: 150 m/min), the corona discharge-treated surface of this film was coated at a dry coating thickness of 0.2 µm with a solution prepared by diluting in ethyl acetate a urethane adhesive (manufactured by Takeda Chemical Industries, Ltd.; main component: "TAKELAC" A3210; curing agent: "TAKENATE" A3070) Drying was effected under low tension at 70° C. for 5 seconds in a hot-air dryer to form a coated anchor layer on the resin substrate. In succession, the surface of the anchor layer on the resin substrate was coated at a dry coating thickness of 0.5 µm with the montmorillonite-containing coating liquid obtained above. Drying was effected under low tension at 120° C. for 10 seconds in a hot-air dryer so that a laminated film was formed. The characteristics of the resulting laminated film are shown in Table 2. The potassium element content in the coated film of this laminated film was 0.5% by weight. As is clear from the results in Table 2. the laminated film was found to have an excellent oxygen-permeation barrier, film-to-substrate bonding and transparency.

Example 6

A laminated film was formed in the same manner used in Example 5, except that the water-soluble polymer of Example 5 was changed to PVOH having a saponification value of 98.0% by mol and a polymerization degree of 300 and PVOH having a saponification value of 99.5% by mol and a polymerization degree of 1,700, the amount of potassium chloride in the aqueous dispersion A1 of the montmorillonite was reduced, and the mixing ratio of the B2 solution to the A3 solution to C2 solution was set to be A3:B2:C2= 2:1:1. The cation leaching of the montmorillonite in the A2 solution was measured to show potassium ions of 75.2 (milliequivalents/100 g) and sodium ions of 31.4 (milliequivalents/100 g).

The characteristics of the resulting laminated film are shown in Table 2. The potassium element content in the coated film of this laminated film was 0.38% by weight. As is clear from the results in Table 2, this film was found to have an excellent oxygen-permeation barrier, film-to-substrate bonding and transparency.

Example 7

A laminated film was formed in the same manner used in Example 5, except that in the preparation of the A1 solution, calcium chloride was used in place of potassium chloride to replace part of the interlaminar sodium ions in the montmorillonite by calcium ions, thereby preparing an A2 solution as a calcium ion-containing montmorillonite. The cation leaching of the montmorillonite in the A2 solution was measured to show calcium ions of 35.2 (milliequivalents/100 g) and sodium ions of 36.2 (milliequivalents/100 g).

The characteristics of the resulting laminated film are shown in Table 2. The calcium element content in the coated film of this laminated film was 0.22% by weight. As is clear from the results in Table 2, this film was found to have an excellent oxygen-permeation barrier, film-to-substrate bonding and transparency.

Example 8

On the biaxially stretched polypropylene film used in Example 5, aluminum was deposited at a thickness of 0.04 µm under high vacuum with an electronic beam-heating depositing apparatus. In the same manner used in Example 5, a coated film was then formed on the metal-deposited film surface to produce a laminated film. The characteristics of the resulting laminated film are shown in Table 2. The potassium element content in the coated film of this laminated film was 0.5% by weight. As is clear from the results in Table 2, this film was found to have an excellent oxygen-permeation barrier and film-to-substrate bonding.

Comparative Example 3

A laminated film was formed in the same manner used in Example 5, except that a sodium ion-type montmorillonite was used without replacement of the interlaminar sodium ions in the montmorillonite by potassium ions. The characteristics of the laminated film are shown in Table 2. The potassium element content in the coated film of this laminated film was 0.01% by weight. As is clear from the results in Table 2, the laminated film had a poor oxygen-permeation barrier and film-to-substrate bonding.

Example 9

A potassium ion-type montmorillonite M1b was prepared by substituting potassium ions for part of the interlaminar sodium ions contained in a high-purity Na-montmorillonite (manufactured by Kunimine Kogyo K. K.) with an average particle diameter of 1.0 µm. The K-montmorillonite M1b was hydrous and cake-shape with a solid content of 37%.

The K-montmorillonite M1b was dispersed in water at a solid content of 4% by weight to prepare an A2b solution. The potassium ion leaching of the montmorillonite in the A2b solution was measured to show 95.3 (milliequivalents/100 g). With regard to the high-purity Na-montmorillonite, the potassium ion leaching was likewise measured to show 2.3 (milliequivalents/100 g). The results are listed in Table 1

TABLE 1

Ion leaching (milligram equivalent/100 g)

|  | K-Montmorillonite | Na-Montmorillonite |
|---|---|---|
| $Na^+$ | 7.1 | 102.7 |
| $K^+$ | 95.3 | 2.3 |
| $Mg^{2+}$ | 1.7 | 3.3 |
| $Ca^{2+}$ | 17.4 | 17.1 |

Then, the A2b solution was mechanically dispersed with a twin mixer (revolutions: 24 rpm and 1,100 rpm) to ensure the absence of agglomerates. Thus, an A3b solution was prepared.

A B1b solution having a solid content of 6.7% by weight was prepared using a saponified product of an ethylene-vinyl acetate copolymer as a water-soluble polymer ("EXCEVAL" AQ4105 manufactured by Kuraray Co., Ltd.) and hot water maintained at 90° C. as a solvent. The B1b solution was again dispersed with a twin mixer to prepare a B2b solution.

The A3b solution was mixed with the B2b solution at a weight ratio of A3 solution:B2 solution=42:58, and the mixture was dispersed with a twin mixer. Further, isopropyl alcohol (hereinafter called IPA) was added at an amount of 20% by weight based on the weight of the whole solvent. Thus, a coating liquid with a solid content of 4.5% by weight was prepared.

A corona discharge-treated, biaxially stretched polypropylene film ("TORAYFAN" T-2535 manufactured by Toray Industries, Inc.; thickness: 20 μm) was used as a resin substrate. Using a gravure coater (coating speed: 150 m/min), the corona discharge-treated surface of this film was coated at a dry coating thickness of 0.2 μm with a solution prepared by diluting a urethane adhesive in ethyl aceate (manufactured by Takeda Chemical Industries, Ltd.; main component: "TAKELAC" A3210; curing agent: "TAKENATE" A3070). Drying was effected under low tension at 70° C. for 5 seconds in a hot-air dryer to form a coated anchor layer on the resin substrate. In succession, the surface of the anchor layer on the resin substrate was coated at a dry coating thickness of 0.5 μm with the montmorillonite-containing coating liquid obtained above. Drying was effected under low tension at 120° C. for 10 seconds in a hot-air dryer so that a laminated film was formed. The characteristics of the resulting laminated film are shown in Table 2, and this film was found to have an excellent oxygen-permeation barrier, film-to-substrate bonding and transparency.

The potassium element content in the coated film of the laminated film was analyzed to be 0.9% by weight.

TABLE 2

|  | Ion leaching in montmorillonite (milligram equivalent/100 g) | Potassium element content in film (wt %) | Sodium element content in film (wt %) | Oxygen permeability 23° C. · 80% RH (ml/m² · d · MPa) | Peeling strength in humid aging 40° C. · 90% RH (N/cm) | Haze (%) |
|---|---|---|---|---|---|---|
| Example 1 | Na = 45.6<br>K = 43.3 | 0.5 | 0.3 | 17 | 0.77 | 11 |
| Example 2 | Na = 45.6<br>K = 43.3 | 0.5 | 0.3 | 3.5 | 0.73 | — |
| Example 3 | Na = 71.5<br>K = 23.6 | 0.3 | 0.5 | 20.2 | 0.61 | 10 |
| Example 4 | Na = 25.5<br>K = 81.1 | 0.9 | 0.2 | 17.4 | 0.82 | 12 |
| Comparative Example 1 | Na = 100<br>K = 2.3 | 0.03 | 0.7 | 35.8 | 0.36 | 11 |
| Comparative Example 2 | Na = 100<br>K = 2.3 | 0.03 | 0.7 | 4 | 0.32 | — |
| Example 5 | Na = 25.5<br>K = 81.1 | 0.5 | 0.2 | 15 | 0.78 | 8 |
| Example 6 | Na = 31.4<br>K = 75.2 | 0.38 | 0.3 | 18 | 0.65 | 10 |
| Example 7 | Na = 36.2<br>Ca = 35.2 | Ca = 0.22 | 0.4 | 18 | 0.58 | 9 |
| Example 8 | Na = 25.5<br>K = 81.1 | 0.38 | 0.2 | 3 | 0.68 | — |
| Comparative Example 3 | Na = 106.6 | 0.01 | 0.7 | 35 | 0.21 | 15 |
| Example 9 | Na = 7.1<br>K = 95.3 | 0.9 | 0.05 | 18 | 0.80 | 11 |

What is claimed is:

1. A laminated film comprising a resin substrate and a coating laminated thereon, wherein said coating comprises a montmorillonite and a water-soluble polymer, and a content of a potassium element in said coating is in the range of 0.1% to 5% by weight based on the weight of the coating.

2. A laminated film according to claim 1, wherein a content of a sodium element in said coating is 0.6% by weight or less based on the weight of the coating.

3. A laminated film according to claim 1, wherein leaching of a cation exchanger other than sodium ions in said montmorillonite is 40 (milliequivalent/100 g) or more.

4. A laminated film according to claim 1, wherein leaching of potassium ions in said montmorillonite is 10 (milliequivalent/100 g) or more.

5. A laminated film according to claim 1, wherein said water-soluble polymer comprises at least two water-soluble resins having different polymerization degrees.

6. A laminated film according to claim 1, wherein said water-soluble polymer comprises polyvinyl alcohol.

7. A laminated film according to claim 1, wherein said water-soluble polymer comprises a saponified product derived from saponification of an ethylene-vinyl acetate copolymer.

8. A laminated film according to claim 1, wherein said resin substrate further comprises a layer disposed at least on one surface thereof, said layer being formed from at least one member selected from the group consisting of a metal, an oxide of metal, a non-metal and an oxide of non-metal.

9. A laminated film according to claim 1, wherein said resin substrate further comprises a coated anchor layer disposed thereon, said coating being overlaid on said coated anchor layer.

10. A laminated film according to claim 1, which has a haze of 20% or layer.

11. A laminated film according to claim 1, wherein said resin substrate is formed from polyolefin.

12. A laminated film according to claim 1, wherein peeling strength between said coating and said resin substrate is 0.5 N/cm or more at a temperature of 40° C. and at a humidity of 90%.

13. A packing material comprising a laminated film according to claim 1.

14. A packaging material according to claim 13, wherein said water-soluble polymer comprises polyvinyl alcohol.

15. A packaging material according to claim 13, wherein said water-soluble polymer comprises a saponified product derived from saponification of an ethylene-vinyl acetate copolymer.

16. A packaging material according to claim 13, wherein said resin substrate further comprises a layer disposed at least on one surface thereof, said layer being formed from at least one member selected from the group consisting of a metal, an oxide of metal, a non-metal and an oxide of non-metal.

17. A packaging material according to claim 13, wherein said resin substrate further comprises a coated anchor layer disposed thereon, said coating being overlaid on said coated anchor layer.

18. A packaging material according to claim 13, wherein said resin substrate is formed from polyolefin.

19. A packaging material comprising a laminated film according to claim 1 and a supporting material disposed thereon.

20. A packaging material according to claim 19, wherein said water-soluble polymer comprises polyvinyl alcohol.

21. A packaging material according to claim 19, wherein said water-soluble polymer comprises a saponified product derived from saponification of an ethylene-vinyl acetate copolymer.

22. A packaging material according to claim 19, wherein said resin substrate further comprises a layer disposed at least on one surface thereof, said layer being formed from at least one member selected from the group consisting of a metal, an oxide of metal, a non-metal and an oxide of non-metal.

23. A packaging material according to claim 19, wherein said resin substrate further comprises a coated anchor layer disposed thereon, said coating being overlaid on said coated anchor layer.

24. A packaging material according to claim 19, wherein said resin substrate is formed from polyolefin.

25. A laminated film comprising a resin substrate and a coating laminated thereon, wherein said coating comprises a montmorillonite and a water-soluble polymer, and a content of a sodium element in said coating is 0.6% by weight or less based on the weight of the coating.

26. A laminated film according to claim 25, wherein leaching of a cation exchanger other than sodium ions in said montmorillonite is 40 (milliequivalent/100 g) or more.

27. A laminated film according to claim 25, wherein leaching of potassium ions in said montmorillonite is 10 (milliequivalent/100 g) or more.

28. A laminated film according to claim 25, wherein said water-soluble polymer comprises at least two water-soluble resins having different polymerization degrees.

29. A laminated film according to claim 25, wherein said water-soluble polymer comprises polyvinyl alcohol.

30. A laminated film according to claim 25, wherein said water-soluble polymer comprises a saponified product derived from saponification of an ethylene-vinyl acetate copolymer.

31. A laminated film according to claim 25, wherein said resin substrate further comprises a layer disposed at least on one surface thereof, said layer being formed from at least one member selected from the group consisting of a metal, an oxide of metal, a non-metal and an oxide of non-metal.

32. A laminated film according to claim 25, wherein said resin substrate further comprises a coated anchor layer disposed thereon, said coating being overlaid on said coated anchor layer.

33. A laminated film according to claim 25, wherein said resin substrate is formed from polyolefin.

34. A packaging material comprising a laminated film according to claim 25.

35. A packaging material according to claim 34, wherein said water-soluble polymer comprises polyvinyl alcohol.

36. A packaging material according to claim 34, wherein said water-soluble polymer comprises a saponified product derived from saponification of an ethylene-vinyl acetate copolymer.

37. A packaging material according to claim 34, wherein said resin substrate further comprises a layer disposed at least on one surface thereof, said layer being formed from at least one member selected from the group consisting of a metal, an oxide of metal, a non-metal and an oxide of non-metal.

38. A packaging material according to claim 34, wherein said resin substrate further comprises a coated anchor layer disposed thereon, said coating being overlaid on said coated anchor layer.

39. A packaging material according to claim 34, wherein said resin substrate is formed from polyolefin.

40. A packaging material comprising a laminated film according to claim 25 and a supporting material disposed thereon.

41. A packaging material according to claim 10, wherein said water-soluble polymer comprises polyvinyl alcohol.

42. A laminated film comprising a resin substrate and a coating laminated thereon, wherein said coating comprises a montmorillonite and a water-soluble polymer, and said water-soluble polymer comprises at least two water-soluble resins having different polymerization degrees, one of said at least two water-soluble resins having an average polymerization degree in the range of 200 to 800, and the other having an average polymerization degree in the range of 1,000 to 2,000.

43. A laminated film according to claim 42, wherein said water-soluble polymer comprises polyvinyl alcohol.

44. A laminated film according to claim 42, wherein said water-soluble polymer comprises a saponified product derived from saponification of an ethylene-vinyl acetate copolymer.

* * * * *